United States Patent Office 3,497,373
Patented Feb. 24, 1970

3,497,373
PHOTOCHEMICALLY STABLE RUTILE PIGMENTS HAVING HIGH BRIGHTNESS AND METHOD FOR PRODUCING SAME
Gerhard Rieck, Leverkusen, and Helmut Weber, Odenthal-Osenau uber Bergisch Gladbach, Germany, assignors to Titangesellschaft m.b.H., Leverkusen, Germany, a corporation of Germany
No Drawing. Filed Mar. 31, 1966, Ser. No. 538,980
Claims priority, application Germany, Apr. 3, 1965,
T 28,319
Int. Cl. C09c 1/36, 3/00; C08g 51/04
U.S. Cl. 106—308                                      3 Claims

ABSTRACT OF THE DISCLOSURE

The present invention relates to a titanium dioxide pigment double coated with $SiO_2$ and/or $Al_2O_3$ and then finally calcined; and to a method for producing the same. This type of pigment has a high brightness and tone coupled with high photochemical stability when used as an opacifying agent in paper laminates.

---

The characteristic photochemical activity of rutile titanium dioxide, upon exposure to light, has impaired the usefulness of rutile titanium dioxide pigment in several fields of application and in particular its use as an opacifier or coloring agent in resins such as melamine and urea formaldethyde resins, and in resinous materials. For example, pressed sheets of laminates produced from rutile $TiO_2$— containing papers and melamine formaldehyde resins—turned definitely gray when exposed to sunlight.

Attempts dating back a long time have been made to reduce the photochemical activity of rutile titanium dioxide pigment by subjecting the pigment to various post-calcination treatments. For example, the calcined and milled pigment has been slurried in water, with the addition of a dispersing agent and alkali and, as the case may be, subjected to wet milling and/or hydroclassification; then treated in any desired sequence with a water soluble silicate and/or water soluble aluminum salt, or, if desired, with other water soluble metal salts forming colorless oxides, followed by the addition of an alkali or ammonia to neutralize the slurry and form insoluble hydrous oxides on the pigment. Thereafter the slurry has been filtered to recover the hydrous oxide treated pigment which is subsequently washed, dried and milled. Calcined rutile titanium dioxide so treated shows improved resistance to chalking, but is not photochemically stable when used in resins and resinous materials. Consequently, efforts have been continued to produce a rutile titanium dioxide pigment having photochemical stability. Thus according to another procedure a calcined rutile titanium dioxide pigment is treated with the hydrous oxides of silica and alumina and subjected to a post-calcination treatment, sometimes referred to as a second calcination, to form a coating on the pigment of aluminum silicate or of the oxides of aluminum and silicon; while in yet another procedure stabilization was attempted by a post-calcination treatment with the combination of hydrous silica, alumina and ceria.

While both of the aforementioned procedures effect some improvements in the photochemical stability of the pigment these improvements have not been sufficient to meet the requirements of the industry in some cases.

A still further process has been developed which applies a double treatment to the calcined pigment in which the pigment is first coated with silica and/or alumina and dried and the dried coated pigment is then further treated with additional silica and/or alumina and dried again. This double coated pigment definitely has improved resistance to chalking but does not have improved photochemical stability when employed in resin systems.

Another process has been developed which improves the color stability in resinous material to a limited extent in which a calcined pigment is treated with alumina and/or silica, then calcined at 600–800° C., preferably 700–750° C., and then treated again with silica and/or alumina. This pigment although possessing fairly good color stability in resinous materials also possesses the undesirable property of loss in brightness and tone. If this treated pigment is calcined at lower temperatures, a bright color is obtained but the color stability is not satisfactory.

An object, therefore, of the present invention is to provide a calcined titanium dioxide pigment of exceptionally high photochemical stability and with good brightness and tone.

A further object of the invention is to provide an improved method for producing a calcined rutile titanium dioxide pigment of exceptionally high photochemical stability and high brightness and tone.

A still further object of the invention is to provide a rutile titanium dioxide-pigmented resinous material which is highly resistant to discoloration when exposed to ultraviolet light and retains high brightness.

These and other objects, features and advantages of the instant invention are described in detail in the specification which follows:

In its broadest sense the present invention relates to a photochemically stable rutile titanium dioxide pigment possessing high brightness which is produced by subjecting a calcined rutile pigment to a first treatment followed by a second treatment with colorless hydrous metal oxides and subsequently calcining the double treated pigment at a temperature from 450–600° C., preferably from 500–550° C., to produce the improved pigment of the instant invention. It should be noted that the pigment produced, surprisingly has a high color stability in resinous materials and also possesses high brightness and tone.

In carrying out the invention the calcined rutile titanium dioxide pigment used as the starting material is obtained according to any of the known procedures of the art including calcining, to the rutile modification, titanium dioxide hydrate prepared by thermal hydrolysis of titanium sulfate solution, or by various chlorination procedures, or from slags consisting mainly of titanium dioxide. This calcined rutile titanium dioxide pigment is subjected to a first post-calcination treatment wherein the calcined pigment is slurried in water, with the aid of a dispersing agent and with the addition of alkali, if desired, after which the dispersed slurry is wet-milled and/or hydroclassified as the case may be.

Salts are added in any desired sequence, and with thorough mixing to the classified pigments. For example, a water-soluble silicate, such as sodium silicate, a water-soluble aluminum salt, such as for example, aluminum sulfate, and/or, if desired other soluble metal compounds or salts capable of forming insoluble substantially colorless or white compound; or substantially insoluble hydrous metal oxides are added to the pigment. In the event the suspension so formed is acid, an alkali or ammonia is added to neutralize the acid suspension and, if desired, additional anions are added to precipitate the metal compounds as insoluble hydrous metal oxides on the pigment. Should the suspension be alkaline it is neutralized by the addition of an acid.

Following precipitation of the insoluble metal oxides as the hydrous metal oxide coating on the pigment, the suspension is neutralized by the addition of an alkali or ammonia and filtered after which the coated pigment is washed, dried and milled.

The second post-calcination treatment on the pigment consists in giving the first coated pigment a second coating of the hydrous metal oxides by a treatment similar to the first coating wherein the first coated pigment is slurried in water, wet-milled and/or hydro-classified, and treated with additional water soluble salts in much the same manner as was done in the first post-calcination treatment. Water soluble salts of silicon and/or aluminum and/or other colorless hydrous oxide forming metals, if desired, are added to the heated slurry which is then neutralized to precipitate the second coating of hydrous oxides on the pigment. Thereafter the slurry is filtered to recover the hydrous oxide coated pigment and the latter is washed, dried and milled. In both treatments the amounts of each hydrous oxide added are from about 0.5% to 5.0% calculated as oxides on a titanium dioxide weight bases.

The milled double coated pigment is then subject to a calcination at a temperature between 400° C. and 600° C., preferably between 500–550° C. to produce the highly photochemically stable and bright pigment of the instant invention.

One specific application of the instant invention is in the field of resinous materials, and in particular paper laminates opacified with the bright and photochemically stable titanium dioxide pigments of this invention. Hence, for the purpose of testing the rutile pigments made according to this invention the pigments were incorporated in laminate papers which were then impregnated with a resin, such as for example, melamine formaldehyde resin or urea formaldehyde resin, in a solution of water and alcohol. After the resin impregnated paper was dried a plurality of sheets of the impregnated paper were superimposed and formed into pigment opacified resinous paper laminates by well-known hot pressing techniques. Specifically, the following procedure was practiced; a laminated paper was prepared from paper stock having the following composition:

80%—bleached sulfite cellulose
20%—bleached sulfate cellulose, milling degree 23–24° S.R.
3.0%—wet strength aiding agent Nadavin FP produced by Farbenfabriken Bayer, A.G.
50%—rutile pigment (the amounts given for wet strength aiding agent and for rutile pigment refer to the total content of absolutely dry cellulose)
Weight of leaf 150–160 g./sq. m.
Ash content 22–24%

This laminated paper was soaked twice with a 50% aqueous solution of melamine-formaldehyde resin. After each soaking the paper was directed in a drying oven at 13° C. for 17 minutes and the resin was thereby precondensed. Subsequently the paper was placed in three layers with a sand-blasted aluminum sheet 1 mm. thick as nucleus between two highly polished chromium-plated steel plates and pressed for 10 minutes at 140° C. and 45 kg./sq. cm. pressure.

The finished plates were exposed in a testing device for light stability for 24 hours, using a Xenon lamp with uniform current. Before and after the exposure the brightness of the plates were determined by an electric remission photometer using a yellow filter, a green filter and a blue filter. The brightness values determined prior to the exposure were designated $R_x$, $R_y$, and $R_z$ and served as a measure for the brightness of the pigment. As a measure for the photochemical stability, the discoloration was chosen, i.e., the percent decrease of the brightness measured after the exposure using the corresponding filters. It was called $V_x$ when using yellow, $V_y$ when using the green, and $V_z$ when using the blue filter. The smaller the values found for discoloration, the better was the photochemical stability of the pigment tested. As a measure of the tone, the difference of the brightness was measured before exposure with the yellow filter and the blue filter: $R_x-R_z$ wherein smaller values indicated a better tone.

To further illustrate the invention the following examples are given. All of the products made according to these examples were tested as described above with respect to photochemical stability, brightness and tone. The results are recorded in the table which follows the examples.

EXAMPLE 1

A calcined rutile pigment, prepared in accordance with any of the normal procedures of the art, was slurried in demineralized water with the aid of sodium metaphosphate and sodium hydroxide as dispersing agents. The dispersion was freed from all coarse constituents by wet ball milling and classification in a centrifuge. The classified calcined rutile pigment was then given a first post-calcination treatment by heating one liter of the pigment slurry, equalling 300 grams titanium dioxide, to 60° C. in a three-neck flask. To this slurry the following additions were made consecutively while maintaining the temperature substantially constant:

(1) 31.6 ml. of a sodium silicate solution having a silicon content of 190 g.p.l. $SiO_2$ corresponding to 2.0% $SiO_2$ on a pigment weight basis, followed by stirring for 10 minutes;

(2) A solution of 39.2 grams of $Al_2(SO_4)_3 \cdot 18H_2O$ in 100 ml. of water, corresponding to 2.0% $Al_2O_3$ calculated on the weight of the pigment used, followed by 10 minutes stirring;

(3) Dilute ammonia solution to maintain the pH value of the slurry at about 8.1 followed by 30 minutes stirring.

The pH of the suspension was frequently checked and maintained constant at about 8.1 by the addition, when necessary, of dilute ammonia. The suspension was then dewatered by suction to recover the hydrous oxide coated titanium dioxide pigment which was then washed repeatedly with water and dried in an electric drying oven at 120° C. for about 15 hours. The hydrous oxide coated pigment was subsequently milled. The treated pigment was again subjected to the second treatment as follows:

300 grams of the first treated pigment were slurried in demineralized water with the addition of sodium hexametaphosphate and sodium hydroxide as dispersing agents the volume of the suspension being 1 liter and the pH value from 9.5 to 10.0. The slurry was then heated to 60° C. and the following additions were made:

(1) 31.6 ml. of sodium silicate solution containing 190 g.p.l. $SiO_2$, which corresponds to 2.0% $SiO_2$ on a $TiO_2$ weight basis, were added followed by vigorous stirring for 10 minutes;

(2) A solution of 39.2 grams $Al_2(SO_4)_3 \cdot 18H_2O$ in 100 ml. of water corresponding to 2% $Al_2O_3$ on the basis of $TiO_2$ treated, followed by stirring for 10 minutes;

(3) Dilute ammonia up to pH of 8.1 followed by stirring for 30 minutes and adjustment of the pH of the slurry to 8.1

The suspension was then dewatered and washed repeatedly with demineralized water. The resulting pigment was dried, milled and calcined for 2 hours at 500° C.

The double treated and calcined pigment was then subjected to the brightness, tone and color stabilizing tests and the results are recorded in the following table.

It should be pointed out from the data presented in the table that this double treated and calcined pigment possesses exceptionally high brightness and color tone coupled with high color stability in resinous materials.

EXAMPLES 2–4

The procedure of Example 1 was repeated except that the double treated pigments were calcined at various temperatures. The results of these double treated and calcined pigments are also recorded in the following table.

TABLE

Treatment:
1st treatment: 2% SiO$_2$+2% Al$_2$O$_3$
2nd treatment: 2% SiO$_2$+2% Al$_2$O$_3$
Followed by calcination

| Example No. | Cal. Temp., °C. | Brightness | | | Tone, $R_x-R_z$ | Discoloration | | |
|---|---|---|---|---|---|---|---|---|
| | | $R_x$ | $R_y$ | $R_z$ | | $V_x$ | $V_y$ | $V_z$ |
| 1 | 500 | 88.65 | 86.55 | 80.0 | 8.65 | 1.1 | 0.3 | −1.7 |
| 2 | 450 | 89.0 | 86.9 | 80.4 | 8.6 | 3.2 | 2.4 | 0.6 |
| 3 | 550 | 87.4 | 85.05 | 78.3 | 9.1 | −0.9 | −1.8 | −4.1 |
| 4 | 600 | 87.5 | 85.1 | 78.3 | 9.2 | −1.0 | −2.1 | −4.4 |

$R_x$: Brightness, measured prior to exposure using a yellow filter.
$R_y$: Brightness, measured prior to exposure using a green filter.
$R_z$: Brightness, measured prior to exposure using a blue filter.
$V_x$: Percent decrease of brightness after exposure for 24 hrs. measured with a yellow filter.
$V_y$: Percent decrease of brightness after exposure for 24 hrs. measured with a green filter.
$V_z$: Percent decrease of brightness after exposure for 24 hrs. measured with a blue filter.

From the foregoing description and the data recorded in the table it is evident that a double treated and calcined pigment prepared according to the process of this invention is improved over the prior art pigments in that it possesses high photochemical stability, coupled with high brightness and tone. Previous pigments either had inferior brightness and tone or inferior color stability, none possessed the combination of superior qualities. In this connection it is noteworthy that this improvement is accomplished by double treating the pigment followed by calcination.

What is claimed is:

1. A process for producing a calcined, rutile titanium dioxide pigment having high brightness and tone coupled with high photochemical stability when said pigment is used as the opacifying agent in a paper laminate which comprises treating a calcined rutile pigment with a first metal hydrous oxide coating agent followed by treating the first coated pigment with a second metal hydrous oxide coating agent, said metal hydrous oxide coating agent being selected from the group consisting of silica and alumina and mixtures thereof in both of said coating treatments, the amount of said coating agent employed in each of said coating treatments being from 0.5% to 5.0% calculated as metal oxide and based on the weight of the titanium dioxide, drying and milling said coated pigment after each of said coating treatments and subsequently calcining said coated pigment at a temperature from 400° C. to 600° C.

2. Process according to claim 1 in which the double-coated titanium dioxide is calcined at a temperature from 500° C. to 550° C.

3. A metal oxide double-coated and calcined rutile titanium dioxide pigment, said double-coated pigment having high brightness and tone coupled with high photochemical stability when said pigment is used as the opacifying agent in a paper laminate, said pigment prepared by treating a rutile titanium dioxide pigment with a first metal hydrous oxide coating agent followed by treating said coated pigment with a second metal hydrous oxide coating agent, said metal hydrous oxide coating agent being selected from the group consisting of silica and alumina and mixtures thereof in both of said coating treatments, the amount of said coating agent employed in each of said coating treatments being from 0.5% to 5.0% calculated as metal oxide and based on the weight of the titanium dioxide, drying and milling said coated pigment after each of said coating treatments and subsequently calcining said double-coated pigment at a temperature from 400° C. to 600° C.

References Cited

UNITED STATES PATENTS

| | | | |
|---|---|---|---|
| 2,671,031 | 3/1954 | Whately | 106—300 |
| 3,035,966 | 5/1962 | Siuta | 106—300 |
| 3,203,818 | 8/1965 | Rechman et al. | 106—300 |
| 3,251,705 | 5/1966 | Rieck et al. | 106—300 |
| 3,316,204 | 4/1967 | Lederer | 106—300 |
| 3,409,501 | 11/1968 | Siuta | 106—300 XR |

JAMES E. POER, Primary Examiner

H. M. S. SNEAD, Assistant Examiner

U.S. Cl. X.R.

106—300, 309; 162—166, 181